United States Patent [19]

Hustad

[11] Patent Number: 4,945,710
[45] Date of Patent: Aug. 7, 1990

[54] METHOD OF FORMING A RECLOSABLE PACKAGE

[75] Inventor: Gerald O. Hustad, McFarland, Wis.

[73] Assignee: Oscar Mayer Foods Corporation, Madison, Wis.

[21] Appl. No.: 266,733

[22] Filed: Nov. 3, 1988

[51] Int. Cl.$^5$ .................... B65B 7/02; B65B 31/02; B65D 73/00
[52] U.S. Cl. .................... 53/432; 53/436; 53/478; 53/486; 206/459
[58] Field of Search ............... 53/432, 433, 436, 478, 53/486, 487, 488, 489; 206/459, 461, 467, 471; 220/306, 307

[56] References Cited

U.S. PATENT DOCUMENTS

| | | | |
|---|---|---|---|
| 3,420,397 | 1/1969 | Miller | 220/307 |
| 3,454,158 | 7/1969 | Tigner | 206/471 |
| 3,460,711 | 8/1969 | Al-Roy | 220/307 |
| 3,498,018 | 3/1970 | Seiferth et al. | 53/433 |
| 3,734,276 | 5/1973 | Bank | 206/497 X |
| 3,792,181 | 2/1974 | Mahaffy et al. | 220/307 X |
| 4,498,588 | 2/1985 | Scott | 206/526 |
| 4,498,589 | 2/1985 | Scott et al. | 206/526 |
| 4,688,369 | 8/1987 | Cornish et al. | 53/436 |
| 4,741,452 | 5/1988 | Holzkopf | 220/306 |

Primary Examiner—Robert L. Spruill
Assistant Examiner—Beth Bianca
Attorney, Agent, or Firm—Joseph T. Harcarik

[57] ABSTRACT

This invention pertains to a reclosable package having a body member, a base, a hermetic seal between the body member and base and snap locking projections in the side walls of the body member and base.

1 Claim, 3 Drawing Sheets

FIG.5
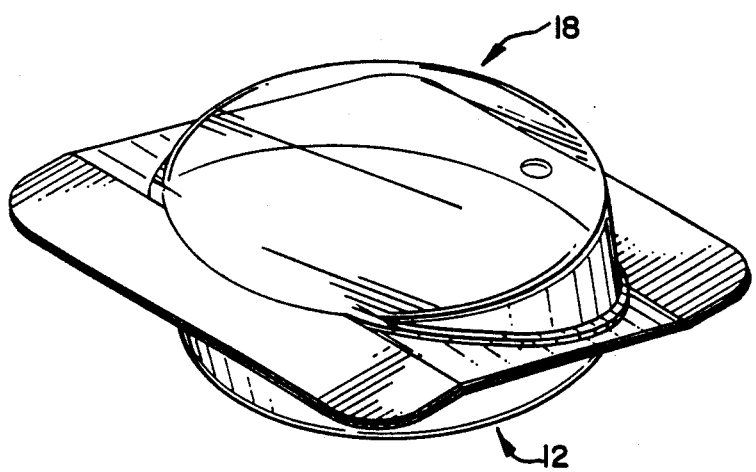
FIG.6
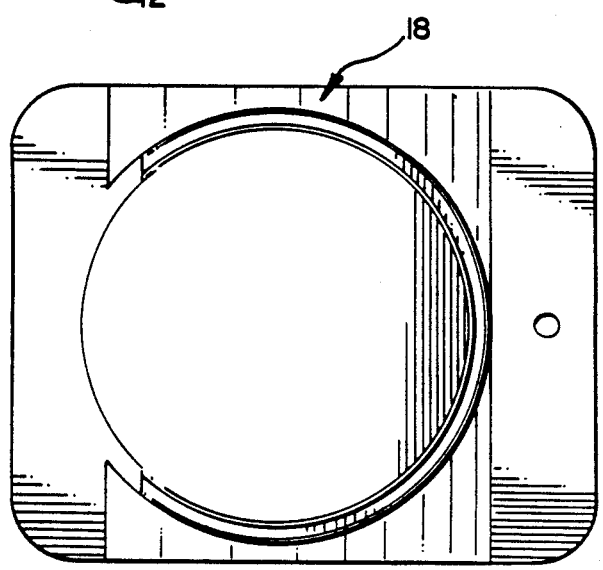
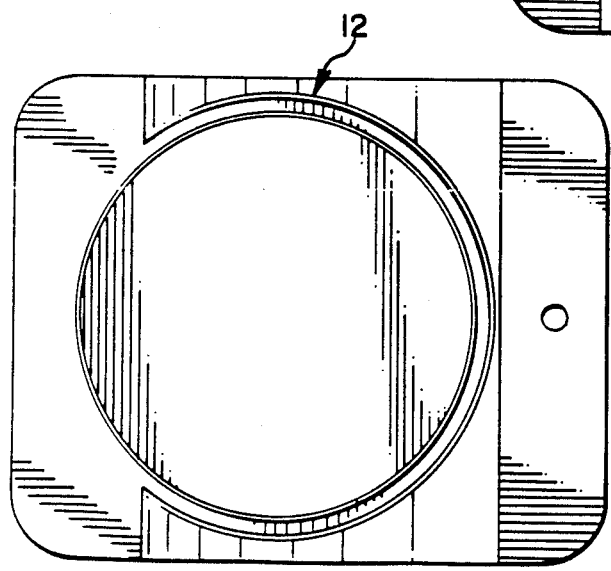
FIG.7

METHOD OF FORMING A RECLOSABLE PACKAGE

BACKGROUND OF THE INVENTION

1. Field of the Invention

This invention pertains to a food package having a base, a body member, a pealing seal for hermetically sealing the base to the cover and the snap-locking means contained in the base and cover for reclosing the package after it has been opened in providing an audible snap as the package is reclosed.

2. Description of the Prior Art

Food packages have been described in the past. For example, in U.S. Pat. No. 3,498,108 a food package is described wherein the food is sealed inside the package having a body and a top member. The food is formed under vacuum and with mechanical pressure thereby forming the food to the package and is hermetically sealed. These types of packages and methods for forming are further described in U.S. Pat. Nos. 4,411,122; 4,577,757; and 4,688,369. Attempts to improve these patents are further described in U.S. Pat. Nos. 4,498,588 and 4,498,589. Various improvements are described, for instance in U.S. Pat. No. 4,498,588, ridges 34, grooves 36, and FIG. 3 are described in an attempt to provide a interlocking engagement. These elements, however, have not proven to be satisfactory in producing a suitable audible snap in reclosing the package. Other means of incorporating snap actions into packages are described in U.S. Pat. Nos. 3,672,536; 3,734,276. It is submitted that these two patents, however, do not describe packages wherein the packaged foods are formed to the package with vacuum and mechanical pressure. Thus, there remains in the art a need for a package that is easily openable and also recloses in a positive manner in providing an audible sound signifying to the consumer that the package has been reclosed, particularly with packages where the food is pressed to conform to the container.

BRIEF DESCRIPTION OF THE DRAWINGS

FIG. 5 is a perspective view of a bias package.

FIG. 6, 7, 8, 9 and 10 are a front view, rear view, side view, top view and bottom view respectively of FIG. 5.

SUMMARY OF THE INVENTION

Figure 1:
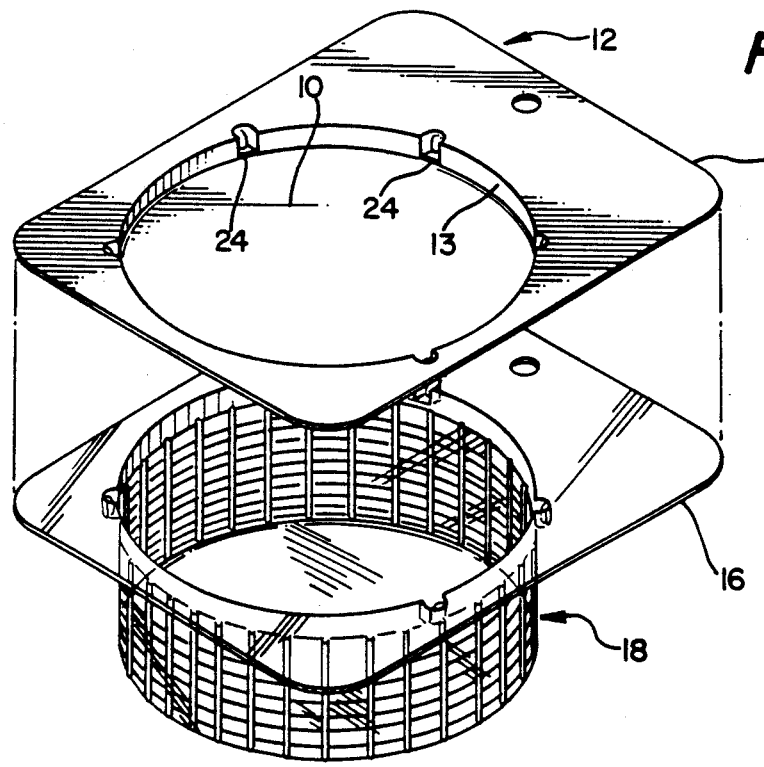
FIG. 1 is a perspective view of a package of the instant invention.
Figure 2:
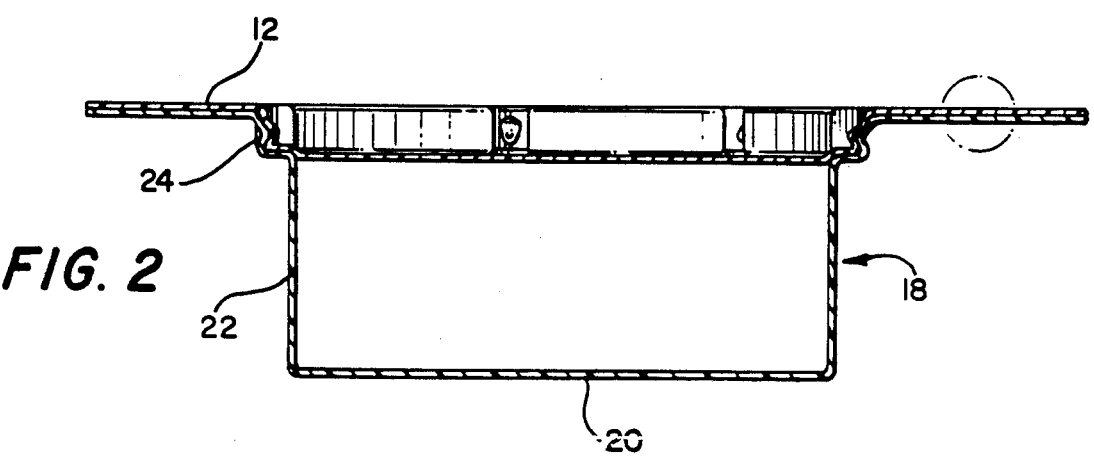
FIG. 2 is a side view of the package of the instant invention.
Figure 3:
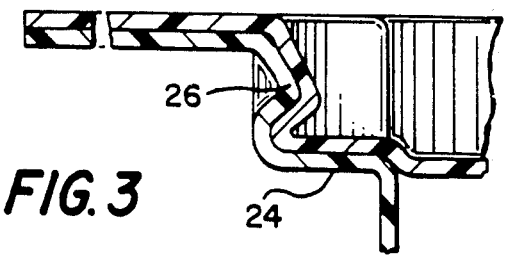
FIG. 3 and FIG. 4 are segments of the package of the instant invention.
Figure 4:
Figure 8:
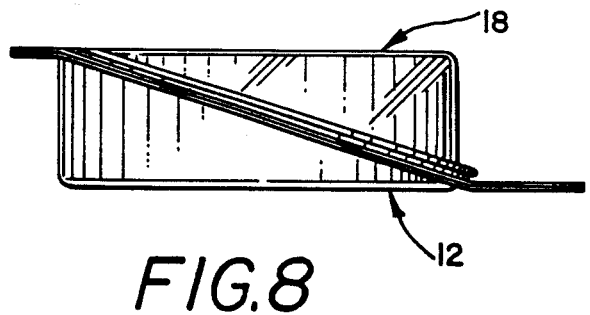
Figure 9:
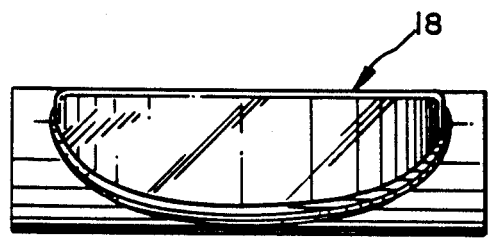
Figure 10:
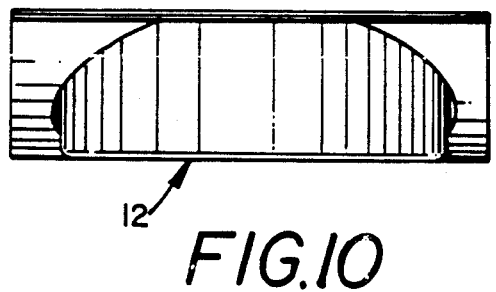

This invention pertains to a food package having a base with a peripheral flange, a side wall and a raised panel portion. A body member is also provided having a peripheral flange, a side wall and a top panel. Said body member cooperates with the base to form a cavity to receive a food product when said base side wall engages said body member side wall in telescoping arrangement of the packaged so that the food may be compressed. Suitable packaged foods include but are not limited to sliced luncheon meats and cheeses. A pealable sealing means is also provided to hermetically seal the body member flange to the base flange. A snap-locking means is also provided in the base side wall and in the body member side wall to provide an audible snap-locking action when the base engages the body member.

DETAILED DESCRIPTION OF THE INVENTION

U.S. Pat. Nos. 3,498,018; 4,411,122; 4,577,757; and 4,688,369 are herein incorporated by reference. These patents describe a method of forming a vacuumized, hermetically sealed package, as shown in the figures, characterized by a pre-determined quantity of a product which is deformable and is arranged in a form of an upright mass of a raised panel (10) portion of a base (12). The base has a side wall (13) and peripheral flange (14), hermetically sealed to a corresponding periperal flange (16) of a body member (18). Preferably, the body member is made of a semi-ridged, pre-formed plastic. The body member has a top panel (20) for engaging the upper end of the product and a depending side wall (22) for engaging the side walls of said product. The top panel is joined to said side wall by a hinge forming portion (24). The bottom edges of the body member side wall are in telescoping relation with the portion of the base at the peripheral edges of said raised panel portion. To fill the package, the body member is placed in an inverted position and a sufficient quantity of product is placed in said body member to substantially fill the body member when the package is completed. The base is positioned on the mouth of the body member so that the product panel disposes in a telescopic way into the body member and engages the product. The flange margins of the base overlay the corresponding margins of the body member. Mechanical pressure is applied inwardly on the outside surface of the raised panel portion. The area defined by the bottom edges of the body side walls is sufficient to force the product into close contact with the interior surfaces of the base and body members to shape the product to conform to the shape of the interior surface and to substantially completely fill the space available between the same and product while vacuumizing the assembly and the sealing of the package by hermetic means.

According to the present invention, projections (24) in the base sidewall and in the body member sidewall are formed. The projections may consist of a number of shapes such as a partial circle, and are high enough (1/16 of an inch or more, ⅛ of an inch preferred and ¼ of an inch more preferred) to allow crimping (26) before or after filling and sealing of the package. Post-thermoforming crimping of the projections cause an audible snap when the body member and base are pressed together. Another means of forming a locking feature is to form the base projection slightly wider than the body projections. This achieves a pinching action when the two parts are pressed together. A glue pattern, if adhesives (28) are applied, progresses around the periphery of the package and conforms to the shape of the tab projections. A minimum of one tab projection and as many as eight or more projections may be formed to achieve a desired reclosable locking action. Other embodiments to assist reclosing are a permanent glue or a heat seal along the base in a score line adjacent to a bottom glue line to function as a hinge. A hinge may also be provided by adhering tape to the base (12) and bubble flange (16) at either package end. Thermoform matching lugs might be provided on the side walls of the base and body member to enhance resealing after the package is opened. When this invention is employed, reclosability and the ability to stay closed is achieved at a low cost by providing one or more points of friction interaction within the sealed area of the package. An audible snap sound is also provided which enhances the perception of freshness preservation once the package is opened. This invention can be applied to round, square or other shaped packages. Also, the projections are visible to the consumer and a pleasing appearance is obtained. To achieve an easy opening, high mocular weight polymer adhesives which are peelable/resealable may be used or easy peel multi-layer rigid films that are heat sealable may be used. Accordingly, features of this invention are thermoforming projections in the body member and base that are part of the side walls that friction fit through a pinching action (top to bottom) with or without a post thermoforming gripping action when the base and body member are pressed together. An audible reclosability of the package base and body member is achieved within the sealed area of the package. Crimping of projections may occur from the side. Preferably it occurs after the package is filled and sealed. Crimping may also occur at room temperature or heat may be applied to the surface of a crimped area and/or imparted by a crimping device. In one embodiment of this invention, as shown in the figures, an example of 5 projections which are a semi-circle is shown. The thickness of the body member is approximately 13 mil. and the thickness of the base is approximately 12 mil. The body member composition may be Barex 210, PET or PVC. The base composition suitably is Barex 210, PVC, saranex laminated to Barex 210, PVC, or polystyrene.

I claim:

1. A method of forming a vacuumized, hermetically sealed package which is characterized by a predetermined quantity of a product which is deformable and is arranged in the form of an upright mass on a raised panel portion of a thermoformed semi-rigid base, which base has peripherally extending flange margins sealed to corresponding flange margins of a body member of a thermoformed semi-rigid preformed plastic, said body member having a top panel for engaging the upper end of said product and depending side walls for engaging the side walls of said product, said top panel being joined to said side walls by a hinge forming portion, and the bottom edges of said body side walls being in telescoping relationship with portions of said base at the peripheral edges of said raised panel portion, said method comprising supporting said preformed body member in inverted position with the flanged margins thereof sealed on the edge portions of a rigid upwardly opening hollow form, placing a sufficient quantity of said product in said body member to substantially fill said body member when the package is completed, positioning said base on the mouth of said body member with said product engaging panel disposed so as to telescope into said body member and engage with said product and with the flanged margins of said base overlying the corresponding margins of said body member, applying mechanical pressure inwardly of the outside surface of said raised panel portion and within the area defined by the bottom edges of said body side wall sufficient to force said product into close contact with the interior surfaces of said base and body members so as to shape said product to conform to the shape of said interior surfaces and to substantially completely fill the space available between the same with a product while vacuumizing the assembly and hermetically sealing the package, wherein the method further includes crimping locking projections in the base and body member side walls for snap locking the base to the body member, said crimping being a post-thermoforming crimping step forming projections which are at least 1/16 of an inch in length and which provide for friction interference fit characterized by an audible snapping sound when the base is snap locked to the body member.

* * * * *